United States Patent Office 3,180,850
Patented Apr. 27, 1965

3,180,850
STABILIZATION OF POLYMERIC ALPHA OLEFINS
WITH NORBORNYL SUBSTITUTED PHENOLS
Jan van Schooten and Ernest G. G. Werner, Amsterdam,
Netherlands, assignors to Shell Oil Company, New
York, N.Y., a corporation of Delaware
No Drawing. Filed June 6, 1961, Ser. No. 115,080
Claims priority, application Netherlands, June 10, 1960,
252,487
14 Claims. (Cl. 260—45.95)

This invention relates to an improved process for the stabilization of polymeric materials. More particularly, the invention relates to an improved process for the stabilization of polymers of ethylenically unsaturated hydrocarbons.

Specifically, the invention provides a process for the stabilization of polymers of ethylenically unsaturated hydrocarbons, particularly of polymers or copolymers of the mono-olefins such as, for example, ethylene, propylene, butene, and the like, which comprises the addition of monophenols in which at least two ring carbon atoms are bound to separate hydrocarbon radicals, at least one of these radicals being a bicyclic cyclo-aliphatic hydrocarbon radical, wherein said cyclo-aliphatic hydrocarbon radical is a norbornyl group, i.e., a bicyclo-(2.2.1)-heptyl group, of which at least one of the hydrogen atoms, but not more than one hydrogen atom per ring carbon atom, may be sustituted. The invention also provides new and novel stabilizers and stabilized polymeric products.

Polymers of ethylenically unsaturated hydrocarbons generally exhibit degradation when processed or stored with resulting deterioration of properties. In order to inhibit and suppress this undesirable degradation and consequent changes in properties, certain compounds called stabilizers are added thereto.

It is known that polymers of ethylenically unsaturated hydrocarbons may be stabilized by the addition of certain monophenols of which at least two ring carbon atoms are bound to separate hydrocarbon radicals and in which at least one of these radicals is a bicyclic cyclo-aliphatic radical derived from a terpene.

Thus, polyethylene produced by Ziegler catalysts at low pressure has been stabilized by the addition of mononuclear monophenols in which one or more cyclic terpene radicals is or are substituted. The cyclic terpenes are mono-, bi- or tricyclic cycloaliphatic hydrocarbons of which the total number of carbon atoms is 10. The monocyclic terpenes consist of a cyclo-aliphatic ring of 6 carbon atoms, to which ring are bound acyclic hydrocarbon radicals having less than 4 carbon atoms. The bi- and tricyclic terpenes are distinguished from the monocyclic ones in that the cyclo-aliphatic ring of 6 carbon atoms contains one or two bridges which may be valency, methylene or isopropylidene bridges.

In the prior art, the phenols so substituted by terpene radicals are invariably isobornyl groups which belong to the bicyclic terpene radicals. Examples of such stabilizers are isobornyl-ortho-cresol, isobornyl-1,2,4-xylienol, di-isobornyl-para-cresol and di-isobornyl-1,2,4-xylenol.

It is also known that the cresols and xylenols substituted by isobornyl groups are improved as stabilizers for polymers of olefins where used in synergistic combination with substantially involatile organic sulfides, such as, for example, dilauryl-beta-thiodipropionate, didodecyl monosulfide and didodecyl disulfide.

It is therefore an object of the invention to provide an improved process for the stabilization of polymeric materials. It is another object of the invention to provide an improved process for the stabilization of ethylenically unsaturated hydrocarbons. It is another object to provide an improved process for the stabilization of polymers of olefins. It is a further object to provide stabilized polymeric products. It is a further object to provide polymers of ethylenically unsaturated hydrocarbons which are thermally stable. It is a further object to provide polymers of olefins which have high resistance to thermal degradation. It is a further object to provide polymers of olefins having good mill aging characteristics. It is a further object to provide polymers of olefins having longer oven aging life. It is a further object to provide polymers of olefins with reduced staining and discoloration in UV light. It is still a further object to provide new and improved stabilizers for polymeric materials. It is still a further object to provide new and improved thermal stabilizers for ethylenically unsaturated hydrocarbons. It is still a further object to provide new and improved thermal stabilizers for polymers of olefins which are effective when used in the absence of other stabilizers. Other objects and advantages of the invention will become apparent to one skilled in the art from the accompanying disclosure and discussion.

It has been discovered that these and other objects may be accomplished by the process for the stabilization of polymers of ethylenically unsaturated hydrocarbons which comprises the addition of monophenols in which at least two ring carbon atoms are bound to separate hydrocarbon radicals, at least one of these radicals being a norbornyl group of which at least one of the hydrogen atoms, but not more than one hydrogen atom per ring carbon atom, may be substituted.

It has also been found that this process for the stabilization of polymers of ethylenically unsaturated hydrocarbons provides polymers which are thermally stable, have good mill aging characteristics, longer oven aging life, and reduced staining and discoloration in UV light.

Also included within the invention are the stabilized polymers and stabilizers.

It has further been found that the stabilizers of the present invention are effective stabilizers when used alone, that is, when used in the absence of other stabilizers, as for example, organic sulfides. Heretofore the cycloaliphatic-substituted phenols have been effective stabilizers for polyolefins only when used with certain organic sulfides as noted below. While it is preferred to use the monophenols of the present invention in combination with one or more organic sulfides, effective thermal stabilization is achieved when the monophenols are used alone. Thus, the new class of stabilizers discovered and disclosed herein are more effective stabilizers than the above-mentioned terpenyl phenols, alone or in combination with organic sulfides.

The new and novel stabilizers of the present invention are monophenols of which at least two ring carbon atoms are bound to separate hydrocarbon radicals and in which at least one of these radicals is a bicyclic cyclo-aliphatic hydrocarbon radical. The distinguishing feature in this case, however, is that this cyclo-aliphatic hydrocarbon radical is a norbornyl group (i.e., a bicyclo-(2.2.1)-heptyl group) of which one or more hydrogen atoms, but not more than one hydrogen atom per ring carbon atom, may be substituted, while the prior art teaches isobornyl groups.

Monophenols are preferably used in which no hydrogen atoms have been substituted in the norbornyl groups, i.e., in which all ring carbon atoms not bound to the aromatic ring carry two hydrogen atoms, except the bridge heads to which only one hydrogen atom is attached.

If desired, one or more of these ring carbon atoms may each be bound to not more than one acyclic hydrocarbon radical. These ring carbon atoms are preferably those which do not constitute bridge heads and are not attached to a phenol ring carbon atom. The acyclic hydrocarbon radical may be, for instance, a short alkyl group having from 1 to 4 carbon atoms or a longer alkyl group. The alkyl groups may be either straight or branched.

Examples of the cyclo-aliphatic hydrocarbon radicals defined above are norbornyl (i.e., bicyclo-(2.2.1)-heptyl), methyl-norbornyl, dimethyl-norbornyl, ethyl-norbornyl, isopropyl-norbornyl, n-butyl-norbornyl, nonyl-norbornyl and methyl-nonyl-norbornyl.

Of these radicals the unsubstituted norbornyl group is particularly preferable since one or more of these groups may be readily substituted in alkylated or unalkylated monophenols by reaction with the aid of norbornene in the presence of, for instance, $BF_3$ etherate. Norbornene may be obtained in a simple manner by means of the Diels-Alder addition reaction of ethene to cyclopentadiene.

The norbornyl groups substituted by alkyl groups may be introduced into the phenols in a similar manner by reaction with an alkyl norbornene which may be prepared by the Diels-Alder addition reaction of olefins having more than 2 carbon atoms to cyclopentadiene.

Preferred monophenols are those in which the para position and at least one of the ortho positions with respect to the hydroxyl group are occupied by a hydrocarbon radical. The presence of norbornyl groups or substituted norbornyl groups in the para position and/or in an ortho position and/or in both ortho positions is particularly preferred. Insofar as the hydrocarbon radicals are not cyclo-aliphatic ones, preference is given to acyclic hydrocarbon radicals, especially alkyl groups.

In addition, it is preferred that both the para position and the two ortho positions of the phenol should be occupied by cyclo-aliphatic radicals of the above type. These radicals may be identical or different.

If the para position and the two ortho positions with respect to the hydroxyl group have not all been occupied by cyclo-aliphatic radicals, it is desirable that at least one of these positions should be occupied by a branched acyclic hydrocarbon radical, for instance, branched alkyl groups having from 3 to 25 carbon atoms, such as, for example, isopropyl, tert.butyl, 2-hexyl, 3-nonyl and sec.-cetyl.

In such cases where a very slight discoloration of the stabilized polymer is permissible during or after the thermal treatment required in the usual processing techniques, while still primarily desiring an excellent stabilization against thermal degradation, it is desirable that the para position with respect to the hydroxyl group be occupied by a short straight chain hydrocarbon, such as, for example, methyl, ethyl, propyl and the like.

If, however, the color has to conform to the strictest requirements, a phenol is preferably employed in which the para position is occupied by a cyclo-aliphatic radical such as norbornyl and substituted norbornyl radicals or a branched alkyl group such as, for example, isopropyl, tert.butyl, 2-hexyl, 3-nonyl, and secondary cetyl.

Examples of the present monophenols are: 2,4,6-trinorbornyl phenol, 2-methyl-3,5,6-trinorbornyl phenol, 4-methyl-2,6-dinorbornyl phenol, 2-methyl-4,6-dinorbornyl phenol, 2,4-dimethyl-3,6-dinorbornyl phenol, 2,6-dimethyl-3,4-dinorbornyl phenol, 2,4-dimethyl-6-norbornyl phenol, 2,6-ditert.butyl-4-norbornyl phenol, 2,4-di-sec-hexadecyl-6-norbornyl phenol, 2,4,6-tri(n.butyl-norbornyl)-phenol, 2-methyl-4,6-di-(n.butylnorbornyl)-phenol, 4-methyl-2,6-di-(n.butylnorbornyl)-phenol, 2,6-dimethyl-4-norbornyl phenol, 4-tert.butyl-2,6-dinorbornyl phenol.

Other phenols may be prepared by the bromomethylation of 2,4-dinorbornyl phenol followed by reaction with ethanoic NaOH solution with a carboxylic acid or formic acid. Examples of such phenols are: 2-ethoxymethyl-4,6-dinorbornyl phenol, 2-formylmethyl-4,6-dinorbornyl phenol, and 2-acylmethyl-4,6-dinorbornyl phenol.

The monophenols of the present invention may be represented by the structure

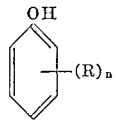

wherein at least one R is a cyclo-aliphatic hydrocarbon radical (norbornyl or substituted-norbornyl) of the structure

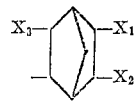

in which $X_1$, $X_2$, and $X_3$ may be hydrogen or an acyclic hydrocarbon radical, preferably a saturated one having up to 10 carbon atoms, such as, for example, methyl, ethyl, propyl, isopropyl, n-butyl, iso-butyl, nonyl, and the like, and the other R's may be a cyclo-aliphatic radical, and preferably the norbornyl or substituted-norbornyl as noted above, or acyclic hydrocarbon radicals as described above, and $n$ is an integer of at least 2 and not more than 5.

Preferred monophenols are those wherein the X's are all hydrogen atoms in the cyclo-aliphatic hydrocarbon radical.

Particularly preferred are those monophenols wherein at least one R is in the 4 position, and still more preferably in the 2,4 or 2,4,6 positions.

PREPARATION OF NORBORNYL PHENOLS

The norbornyl phenols may be prepared by reacting alkylated or unalkylated monophenols with norbornene or alkyl-substituted norbornene in the presence of a suitable catalyst such as $BF_3$ etherate. The norbornene (bicyclo-(2.2.1)-2-heptene) is first prepared by Diels-Alder addition of ethylene to mono- or dicyclopentadiene. The addition reaction is usually performed under autogenous pressure at about 200° C. or higher with stoichiometric quantities usually being used. The alkyl-substituted norbornene such as n-butyl-norbornene, may be prepared in a similar manner by the Diels-Alder addition reaction of an olefin having more than two carbon atoms, such as hexene-1, to mono- or dicyclopentadiene. These norbornyl groups substituted by alkyl groups may then be introduced into the monophenols in a similar manner by the reaction of the alkyl-norbornene with the alkylated or unalkylated monophenols with a suitable catalyst at a temperature up to about 130° C.

Among the phenols which are suitable for the preparation of the norbornyl phenol stabilizers are phenol, ortho-, meta- and para-cresol, the various xylenols and trimethyl phenols, 2-methyl-4-ethyl-phenol, para-ethyl phenol, para-isopropyl phenol, para-tert.butyl phenol, 2,4-di-isopropyl phenol, para-tert.octyl phenol, and the like.

The catalysts which are suitable for carrying out the necessary process for preparing the novel norbornyl phenols are the acidic catalysts such as, for example, such well-known catalysts as sulfuric acid, phosphoric acid, benzene sulfonic acid, para-toluene sulfonic acid, stannic chloride, zinc chloride, aluminum chloride, fluoroboric acid, hydrofluoric acid, ferric chloride, and the boron trihalides such as boron trichloride, boron trifluoride, and their ether complexes.

Boron trifluoride and boron trifluoride-etherates are generally preferred as catalysts. A few percent by weight of the catalyst is usually sufficient to produce the desired reaction, and preferably from about 1 to 6% by weight of phenolic compound.

In order to reduce undesirable side reactions, such as isomerization and polymerization, to avoid formation of aromatic ethers and to promote direct substitution into aromatic nucleus, temperatures in excess of 130° C. should be avoided, the preferred range being from 70–110° C. with temperatures between 80 and 100° C. being especially preferred.

In carrying out the alkylation reaction, stoichiometric proportions of the monophenol or alkyl-substituted monophenol, and the norbornene or alkyl-substituted norborne, may be used although the ratio may be altered widely in favor of either reactant.

Since the norbornyl phenols are highly viscous liquids to solids, it is frequently desirable to use a diluent in order to facilitate the agitation during addition reaction and to lower the viscosity of the reaction mixture. The diluents which may be satisfactory include benzene, toluene, ethylene chloride, and cyclohexane.

In general, the following experimental procedure was used for the alkylation reaction. A slight excess of olefin was added slowly at 50° C. with stirring to a solution of the phenolic component and $BF_3$-etherate in cyclohexane. After the olefin addition, the temperature was raised to 80° C. to 100° C. and the mixture stirred for 5–7 hours. The reaction mixture was then diluted with cyclohexane and the catalyst neutralized by washing with 10% $K_2CO_3$ solution. Finally, after drying over $Na_2SO_4$, the products were purified by fractional distillation or crystallization techniques. After purification, the products were analyzed by mass spectrometric (MS) and infra-red (IR) methods and by gas-liquid chromatography (GLC).

*Example I*

This example illustrates the preparation of norbornene, bicyclo-(2.2.1)-2-heptene. 500 g. dicyclopentadiene in a 5-liter autoclave were placed under 60 atm. of ethylene pressure. Over a period of three hours, the pressure was kept constant while the temperature was raised to 200° C. The reaction mixture was heated at 200° C. for an additional three hours. The reaction product was fractionated by distillation and 467 grams of norbornene was obtained at a 64% yield. The boiling point at 760 mm. is 96° C.

*Example II*

This example illustrates the preparation of n-butyl norbornene. 198 g. of cyclopentadiene and 390 g. hexene-1 were heated in a 5-liter autoclave at 200° C. for three hours and then at another 2 hours at 250° C. Fractional distillation gave 182 g. of n-butyl norbornene having a boiling point of 90° C. at 3 mm. pressure.

*Example III*

This example illustrates the preparation of 2,4,6-trinorbornyl phenol. 47 grams of phenol were reacted with 150 g. of previously prepared norbornene at a temperature of about 90° C. using 5% $BF_3$-etherate on phenol. The 154 grams of 2,4,6-trinorbornyl phenol product is an 82% yield based on phenol. The boiling point at 0.5 mm. is 245° C. After crystallization from ethanol the melting point was found to be 135–136° C. The hydroxyl value was 2.72 meq./g. compared to the theoretical value of 2.66. A purity of 99% and 100% was obtained as determined by GLC and mass spectrometric methods, respectively.

*Example IV*

245 g. of 90% pure 2-methyl-4,6-dinorbornyl phenol was prepared from 108 g. o-cresol and 196 g. norbornene giving a yield of 83%. The boiling point at 0.8 mm. is 200–205° C. and has a hydroxyl value of 3.33 meq./g. compared to a theoretical 3.38.

*Example V*

From 54 g. p-cresol and 96 g. norbornene 128 g. of resin-like 4-methyl-2,6-dinorbornyl phenol (86% yield) was obtained. The boiling point at 1.5 mm. is 205–210° C. After crystallization from methanol, the melting point is 93–94° C., the hydroxyl value 3.47 meq./g. and purity better than 99%.

*Example VI*

By reacting at room temperature for 24 hours, 64 g. 2,6-di-tert.butyl phenol and 40 g. norbornene produced 38 g. 4-norbornyl-2,6-di-tert.butyl phenol (40% yield) having a boiling point at 0.8 mm. of 160–165° C. and a melting point of 52–56° C. The hydroxyl value was 3.31 meq./g. compared to a theoretical 3.33. By GLC and MS analysis the purity was about 99%.

*Example VII*

From the fractional distillation of the reaction product of 75 g. 4-tert.butyl phenol and 95 g. norbornene, 118 grams of 4-tert.butyl-2,6-dinorbornyl phenol (70% yield) was obtained with about 98% purity.

*Example VIII*

The reaction product from 61 g. 2,4-xylenol and 100 g. norbornene when vacuum distilled gave 33 g. of 93% pure 2,4-dimethyl-6-norbornyl phenol, a yield of 31%. The boiling point at 3.0 mm. is 157–159° C., the melting point is 56–57° C., and the hydroxyl value is 4.59 meq./g. (theoretical is 4.63 meq./g.).

*Example IX*

Distillation of the reaction product of 61 g. 2,6-xylenol and 97 g. norbornene gave 21 g. of 2,6-dimethyl-4-norbornyl phenol (20% yield) having a boiling point at 2 mm. of 153–155° C. and a melting point of 68–70° C. The purity was about 96% and the phenolic product had a hydroxyl value of 4.53 meq./g.

*Example X*

2,4-di-sec-hexadecyl phenol having a hydroxyl value of 1.77 meq./g. was first prepared from phenol and hexadecene-1. 109 g. of this 2,4-di-sec-hexadecyl phenol and 20 g. norbornene with 3 g. $BF_3$ in ether were heated at 85° C. for 6 hours. The main product was 2,4-di-sec-hexadecyl-6-norbornyl phenol having a hydroxyl value of 1.52 meq./g. compared to the theoretical value of 1.57.

*Example XI*

Approximately 71 grams of 2,4,6-tri-n-butylnorbornyl phenol having a hydroxyl value of 1.80 meq./g. was obtained from 12.2 g. phenol and 60 g. n-butyl-norbornene (yield 86%).

*Example XII*

60 grams of 2-methyl-4,6-di-n-butylnorbornyl phenol was prepared from 16.2 g. o-cresol and 45 g. n-butylnorbornene. The product (98% yield) had a hydroxyl value of 2.42 compared to a theoretical 2.44.

*Example XIII*

60 grams of 4-methyl-2,6-di-n-butylnorbornyl phenol having a hydroxyl value of 2.46 meq./g. was prepared from 16.2 g. p-cresol and 45 g. n-butylnorbornene.

It is preferred to use the monophenols according to the invention in combination with one or more organic sulfides of the $R_1$—$S_x$—$R_2$ type, wherein $x$ is an integer from 1 to 3 and $R_1$ and $R_2$ represent similar or dissimilar hydrocarbon radicals containing C atoms bound to $S_x$, and preferably having from 1 to 25 carbon atoms, and more preferably more than 3 carbon atoms. Examples of such organic sulfides include, among others, methyl propyl monosulfide, dicetyl monosulfide, di-isobutyl monosulfide, di-isobutyl disulfide, dicetyl monosulfide, dicetyl disulfide, di-eicosyl monosulfide, di-eicosyl disulfide, n-dodecyl-cetyl sulfide, and didodecyl disulfide. The di- and polysulfides are preferred to the monosulfides, that is, when $x$ is 2 or more.

Particularly suitable organic sulfides are the compounds in which at least one and preferably both carbon atoms bound to sulfur are aliphatic and which are themselves also bound to an aliphatic carbon atom. Particularly suitable are the sulfides of the $$R_1—CH_2—CH_2—S_x—R_2$$

type or $R_1—CH_2—CH_2—S_x—CH_2—CH_2—R_2$ type, wherein $x$ is again an integer from 1 to 3 and $R_1$ and $R_2$ represent similar or dissimilar aliphatic or aromatic radicals, having preferably up to 25 carbon atoms, for instance, the beta-thio-ethers or propionic acid esters, as well as the higher dialkyl mono-, di- and polysulfides, for example, n-dodecyl-cetyl sulfide, dicetyl monosulfide, dicetyl disulfide, di-eicosyl monosulfide, di-eicosyl disulfide, and di-dodecyl disulfide.

Also suitable are the organic sulfides of the $$R_1SR—COOR_2$$

type, wherein R is an aliphatic radical having from 1 to 8 carbon atoms and $R_1$ and $R_2$ represent similar or dissimilar aliphatic or aromatic radicals having up to 25 carbon atoms.

These organic sulfides may be prepared by esterifying ethylenically unsaturated acids, such as, for example, acrylic acid with an alcohol, such as methyl, ethyl, propyl, iso-propyl, butyl and the like, and then reacting or adding a monomercaptan to the double bond, preferably in the presence of ultraviolet light. Examples of such organic sulfides include, among others, methyl-3-thiabutane-1-carboxylate, ethyl-3-thiabutane-1 - carboxylate, propyl-3-thiabutane-1-carboxylate, methyl - 4 - thiapentane-1-carboxylate, ethyl-5-thiahexane-1 - carboxylate, ethyl-6-thiaheptane - 1 - carboxylate, and iso - propyl-7-thiononane-1-carboxylate.

Especially suitable organic sulfides are the dialkyl esters of thiodialkane carboxylic acids which may be represented by the formula:

$$R_3OOR_1SR_2COOR_4$$

wherein $R_1$ and $R_2$ are similar or dissimilar divalent aliphatic hydrocarbon radicals having at least 2 and preferably not more than 4 carbon atoms, and $R_3$ and $R_4$ are alkyl, cycloalkyl, and/or arylalkyl groups. Very good results have been obtained with dialkyl esters of beta-thiodipropionic acid. It is advisable for the radicals (groups) $R_1$, $R_2$, $R_3$ and $R_4$ to be such that the boiling point of the compound exceeds 250° C.

The preferred ester for use in the present invention is dilauryl beta-thiodipropionate (DLTP) and is a well-known commercially available material. Methods are known for preparing various esters of the same general type in which other hydrocarbyl groups are present. For example, several methods for preparing thio-dialkanoic acids are known. Beilstein, vol. 3, page 300, describes two methods for preparing thiodipropionic acid. The second supplement of Beilstein describes further methods. These methods can be modified to prepare thiodiacetic acid or thiodibutyric acid. The methods for producing the corresponding esters of these acids are also well-known. In esterifying the thiodialkane carboxylic acids to produce suitable esters, it is preferable to employ monohydric alcohols containing at least about 10 carbon atoms with $C_{12}$ to $C_{16}$ alcohols being especially preferred.

Thiuram disulfide, particularly the tetra-alkyl derivatives thereof, is suitable as the sulfidic stabilizer component.

Polymeric products of the type of the polyalkoxyalkyl sulfides $(—R_1—O—R_1—S—)_x$, polyalkoxy-alkoxyalkyl sulfides $(—R_1—O—R_2—O—R_1—S—)_x$, or polyhydroxy alkyl sulfides $(—R_1(OH—S—)_x$, as further described in the German published Patent 1,048,022, may also be used in combination with the monophenols according to the invention. Such a polymeric product may be obtained, inter alia, by reacting an unsaturated ether, for example, diallyl ether, with hydrogen sulfide.

The use of di- and polysulfides are preferred over the monosulfides in combination with the novel norbornyl phenol stabilizers since better and improved stabilization is achieved when the di- and polysulfides are used than when the monosulfides are employed.

The monophenol stabilizers are employed in a stabilizing amount and preferably from about 0.001% to 5% by weight based on the polymer to be stabilized, and most preferably from about 0.001% to 1%. Likewise, the amount of the organic sulfide stabilizer is employed in a stabilizing amount, and preferably between 0.001% to 5% by weight.

The addition of the stabilizers may be accomplished in various known ways, for example, the stabilizers may be milled into the polymers by the use of heated roll mills or on a Banbury mill. In general, the temperatures used during milling are dependent upon the particular polymer being stabilized.

The temperatures usually employed are from about 140° C. to 200° C. and preferably from about 150° C. to 190° C. The stabilizers may also be added to the final washed polymer slurry prior to drying or they may be added to the powder (fluff) prior to extrusion into nibs. The temperatures employed during the extrusion may be slightly higher than the temperatures employed during milling. The stabilizers can be added during the first stages of work-up, and it is preferable to add at least one or more stabilizers at the earliest possible stage.

If the polymer is separated from the organic diluent used during the polymerization by steam stripping, one or more stabilizers may be added simultaneously with the steam or immediately prior thereto. In certain cases it may be advantageous to use only the most stable stabilizer(s) during the steam treatment and to add the less stable component(s) to the final polymer. If desired, a quantity of one or more stabilizers may be added subsequent to the steam stripping of the final polymer.

Advantages of the invention are illustrated by the following examples. The reactants, and their proportions, and other specific ingredients of the recipes are presented as being typical and various modifications can be made in view of the foregoing disclosure and discussion, without departing from the spirit or scope of the disclosure or of the claims. Unless otherwise specified, parts and percentages disclosed in the examples are by weight.

*Example XIV*

Stabilization experiments were carried out with a polypropylene prepared with the use of a catalyst system composed of $TiCl_3$ and aluminum diethyl chloride. This $TiCl_3$ was obtained from $TiCl_4$ and aluminum triethyl. The intrinsic viscosity of the polymer was 2.7 (determined in decahydronaphthalene at 135° C.).

The stabilizers used were the phenols indicated in Table I, including for comparison two phenols substituted by isobornyl groups.

The phenol was invariably used in a quantity of 0.15% by weight, based on the polymer.

The polymer powder was intimately mixed with the stabilizer and milled for some minutes at 180° C. 0.5 mm. thick sheets were pressed from the hide at 230° C. These sheets were kept in a desiccator at 135° C. while exposed to the atmosphere. The table shows in the column indicating the "oven life at 135° C." the number of days after which a certain mixture proved to be brittle.

In addition, 1 mm. thick sheets were pressed from a number of the said hides at 230° C. and 300° C. for 3 minutes, after which the intrinsic viscosity (at 135° C. in decahydronaphthalene) of these sheets was determined. The values found are also indicated in the table. Table I also shows the values of the intrinsic viscosity after aging on the roller mill. In these aging experiments, the hides obtained at 180° C. were subjected to a continued roller mill treatment at the same temperature for 5 or 30 minutes before the intrinsic viscosity was determined (again at 135° C. in decahydronaphthalene).

At the end of the experiments no appreciable discoloration was observed (experiments 2, 4, 6, 7, 8, 9 and 12) of none of the sheets or hides stabilized with a phenol in which the para position with respect to the hydroxyl group is not occupied by a methyl group.

stabilizer a quantity of not more than 0.03% by weight was added to the polymer. The results are stated below.

| Stabilizer: | Oven life at 135° C., days |
|---|---|
| 2,4,6-trinorbornyl phenol | 5 |
| 4-methyl-2,6-dinorbornyl phenol | 15 |

The 4-methyl-2,6-dinorbornyl phenol which in the experiments described in Example XIV produced a slight discoloration of the polymer hardly caused any discoloration in this case.

TABLE I

| Experiment No. | Stabilizer | Oven life at 135° C., days | Intrinsic viscosity of sheets pressed at— | | Intrinsic viscosity after a milling period of— | |
|---|---|---|---|---|---|---|
| | | | 230° C. | 300° C. | 5 min. | 30 min. |
| 1 | None | <1 | 1.8 | 1.5 | 1.0 | |
| 2 | 2,4,6-trinorbornyl phenol | 20 | 2.3 | 2.0 | 2.6 | 2.5 |
| 3 | 4-methyl-2,6-dinorbornyl phenol | 25 | 2.5 | 2.1 | 2.6 | 2.6 |
| 4 | 2-methyl-4,6-dinorbornyl phenol | 5 | 2.4 | 2.0 | 2.6 | 2.6 |
| 5 | 2,4-dimethyl-6-norbornyl phenol | 4 | 2.1 | 2.1 | 2.6 | 2.5 |
| 6 | 2,4-di-sec.hexadecyl-6-norbornyl phenol | 4 | | | 2.6 | 2.5 |
| 7 | 2,6-ditert.butyl-4-norbornyl phenol | 4 | 2.3 | 1.7 | 2.6 | 2.6 |
| 8 | 2,4,6-tri(n.butylnorbornyl) phenol | 6 | | | 2.6 | 2.6 |
| 9 | 2-methyl-4,6-di(n.butylnorbornyl) phenol | >16 | | | 2.6 | 2.5 |
| 10 | 4-methyl-2,6-di(n.butylnorbornyl) phenol | >16 | | | 2.6 | 2.6 |
| 11 | 4-tert.butyl-2,6-dinorbornyl phenol | 11 | | | 2.6 | 2.5 |
| 12 | 2-methyl-4,6-di-isobornyl phenol | 2 | 2.3 | 1.8 | 2.6 | 2.4 |
| 13 | 2,4-dimethyl-6-isobornyl phenol | 2 | 2.2 | 1.9 | 2.6 | 2.4 |

*Example XV*

The experiments described in Example XIV were repeated except that the stabilizers used were invariably 0.3% by weight of dilauryl-beta-thiodipropionate (DLTP) in combination with 0.15% by weight of the novel phenolic stabilizers (based on the polymer). For the purpose of comparison a series of experiments was also carried out with the use of only 0.3% by weight of DLTP. The results are given in Table II. No discoloration was observed in the experiments 2, 4, 6 and 11.

*Example XVII*

The experiments with respect to the oven life at 135° C. described in Example XV were repeated with the exception that instead of 0.3% by weight of DLTP an equal quantity of n.dodecyl-n.cetyl sulfide was added.

In the case of the two isobornyl phenols an oven life of 60 days was found while all the norbornyl phenols led to an oven life of more than 100 days.

*Example XVIII*

Various amounts of antioxident were blended into polyethylene having a melt index of 0.25. The resulting blends were then formed into films and heated to 125° C. or 140° C. in an oxygen atmosphere. The stability of the blends was indicated by the induction time, that is, the time before appreciable oxygen absorption began. The results are given in Table III.

TABLE II

| Experiment No. | Stabilizers | Oven life at 135° C., days | Intrinsic viscosity after a milling period of— | |
|---|---|---|---|---|
| | | | 5 min. | 30 min. |
| 1 | DLTP | 20 | 2.0 | 1.8 |
| 2 | DLTP+2,4,6-trinorbornyl phenol | 175 | 2.6 | 2.6 |
| 3 | DLTP+4-methyl-2,6-dinorbornyl phenol | 156 | 2.6 | 2.6 |
| 4 | DLTP+2-methyl-4,6-dinorbornyl phenol | 181 | 2.6 | 2.6 |
| 5 | DLTP+2,4-dimethyl-6-norbornyl phenol | 108 | 2.6 | 2.5 |
| 6 | DLTP+2,6-ditert.butyl-4-norbornyl phenol | 93 | 2.6 | 2.6 |
| 7 | DLTP+2,6-dimethyl-4-norbornyl phenol | 113 | 2.6 | 2.5 |
| 8 | DLTP+4-methyl-2,6-di-n-butyl-norbornyl phenol | 150 | 2.6 | 2.5 |
| 9 | DLTP+2-methyl-4,6-di-n-butyl-norbornyl phenol | 107 | 2.6 | 2.5 |
| 10 | DLTP+2,4-di-sec-hexadecyl-6-norbornyl phenol | 105 | 2.6 | 2.5 |
| 11 | DLTP+2-methyl-4,6-diisobornyl phenol | 60 | 2.6 | 2.4 |
| 12 | DLTP+2,4-dimethyl-6-isobornyl phenol | 60 | 2.6 | 2.4 |

*Example XVI*

The experiments with respect to the oven life at 135° C. described in Example XIV were repeated for 2,4,6-trinorbornyl phenol and 4-methyl-2,6-dinorbornyl phenol with the exception that instead of 0.15% by weight of

TABLE III

| Antioxidant | Induction time, hours | |
| --- | --- | --- |
| | At 125° C. | At 140° C. |
| None | 35 | 6 |
| 0.05 phr [1] 2,4,6-trinorbornyl phenol | 74 | 20 |
| 0.1 phr 2,4,6-trinorbornyl phenol | | 20 |
| 0.1 phr 2,6-ditert.butyl-4-norbornyl phenol | | 30 |
| 0.017 phr 2,4,6-trinorbornyl phenol plus 0.033 phr di-n-cetylsulfide | 44 | 11 |
| 0.017 phr 2,4,6-trinorbornyl phenol plus 0.033 phr di-n-cetylsulfide plus 0.3 phr ZnS | 218 | 43 |

[1] Parts per hundred.

Example XIX

In order to determine the effect of milling on color with the novel stabilizers, 0.1 phr. of the antioxidant was blended into Ziegler polyethylene having a melt index of 0.23. This blend was then milled on hot rolls at 150° C. for 30 minutes and 60 minutes. The effect of milling on color is given below in Table IV. The test run with Santonox-R, 4,4'-thio-bis(3-methyl-6-tert.butyl phenol) is included for comparison.

TABLE IV

| | Color | | |
| --- | --- | --- | --- |
| Milling time in minutes | 0 | 30 | 60 |
| 2,4,6-trinorbornyl phenol | 83 | 82 | 82 |
| 2,6-ditert.butyl-4-norbornyl phenol | 77 | 77 | 78 |
| Santonox-R | 80 | 73 | 70 |

Example XX

The experiments with respect to oven life at 135° C. described in Example XV is repeated except that ethyl-3-thiobutane-1-carboxylate is used instead of DLTP. Related results are obtained.

Example XXI

This example illustrates the superiority of the disulfides over the monosulfides in combination with the novel norbornyl phenols, such as 2,4,6-trinorbornyl phenol. Samples of polypropylene described in Example XIV were stabilized with mixtures of 2,4,6-trinorbornyl phenol and dicetyl monosulfide and mixtures of 2,4,6-trinorbornyl phenol and dicetyl disulfide. The polymer thus stabilized was then heated a few minutes to 160° C. at atmospheric pressure in a reaction vessel filled with oxygen to which an open mercury manometer had been connected. By measuring the oxygen consumption as a function of time, the induction period was determined. Such induction period is the time elapsed between the moment when heating is begun and the moment when oxygen consumption begins to rise rapidly. The results are tabulated in Table V.

TABLE V

| 2,4,6 Trinorbornyl phenol, percent w. | Dicetyl monosulfide, percent w. | Dicetyl disulfide, percent w. | Induction periods, minutes |
| --- | --- | --- | --- |
| 0.06 | 0.25 | | 5,000 |
| 0.06 | | 0.25 | 5,400 |
| 0.06 | 0.50 | | 5,500 |
| 0.06 | | 0.50 | 6,000 |
| 0.10 | 0.25 | | 6,900 |
| 0.10 | | 0.25 | 8,200 |
| 0.10 | 0.50 | | 9,000 |
| 0.10 | | 0.50 | 12,000 |
| 0.15 | 0.25 | | 5,700 |
| 0.15 | | 0.25 | 7,500 |
| 0.15 | 0.50 | | 10,000 |
| 0.15 | | 0.50 | 12,000 |
| 0.30 | 0.25 | | 4,000 |
| 0.30 | | 0.25 | 4,300 |
| 0.30 | 0.50 | | 7,100 |
| 0.30 | | 0.50 | 9,000 |

We claim as our invention:

1. A composition of matter having the formula:

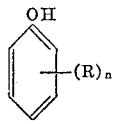

wherein at least one R is a cyclo-aliphatic hydrocarbon radical of the structure

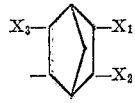

in which $X_1$, $X_2$ and $X_3$ is selected from the group consisting of hydrogen and acyclic alkyl radicals having up to 10 carbon atoms, and the other R's are selected from the group consisting of said cyclo-aliphatic and said alkyl radicals, and $n$ is an integer of at least 2 and not more than 5.

2. A composition of matter as in claim 1 wherein the para position and at least one of the ortho positions with respect to the hydroxyl group is occupied by said cyclo-aliphatic hydrocarbon radical.

3. A composition of matter as in claim 2 wherein the para position is occupied by a norbornyl group.

4. 2,4,6-trinorbornyl phenol.

5. 4-methyl-2,6-dinorbornyl phenol.

6. 2,6-ditertiary butyl-4-norbornyl phenol.

7. A composition comprising polymers of mono-olefins containing from about 2 to 4 carbon atoms and a stabilizing amount of a composition having the formula

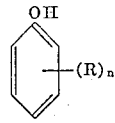

wherein at least one R is a cyclo-aliphatic hydrocarbon radical of the structure

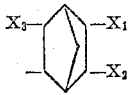

in which $X_1$, $X_2$ and $X_3$ are selected from the group consisting of hydrogen and alkyl radicals having up to 10 carbon atoms, and the other R's are selected from the group consisting of said cyclo-aliphatic and said alkyl radicals, and $n$ is an integer of at least 2 and not more than 5.

8. A composition as in claim 7 wherein the para position and at least one of the ortho positions with respect to the hydroxyl group is occupied by a cyclo-aliphatic hydrocarbon radical selected from the group consisting of norbornyl and alkyl-substituted norbornyl radicals.

9. A composition as in claim 7 wherein the para position is occupied by a norbornyl group.

10. A composition as in claim 7 wherein at least one position is occupied by a branched acyclic alkyl group having from 3 to 25 carbon atoms.

11. A composition as in claim 7 wherein the monophenol is 2,4,6-trinorbornyl phenol.

12. A composition as in claim 7 wherein the monophenol is 4-methyl-2,6-dinorbornyl phenol.

13. A composition as in claim 7 wherein the monophenol is 2,6-ditertiary butyl-4-norbornyl phenol.

14. A composition as in claim 7 wherein the polymer is polypropylene.

References Cited by the Examiner

UNITED STATES PATENTS 2,537,647  1/51  Kitchen _____ 260—619
3,074,909  1/63  Matlach _____ 260—45.95

OTHER REFERENCES

Kitchen et al.: Industrial and Engineering Chem., vol. 42, pages 675–685.

Raff et al.: "Polyethylene," Interscience Pub., New York, 1956, pages 103–108.

LEON J. BERCOVITZ, *Primary Examiner.*

MILTON STERMAN, *Examiner.*